Feb. 26, 1957
F. L. DAVIS
2,782,660
VARIABLE SPEED TRANSMISSIONS
Filed Jan. 7, 1953
2 Sheets-Sheet 1
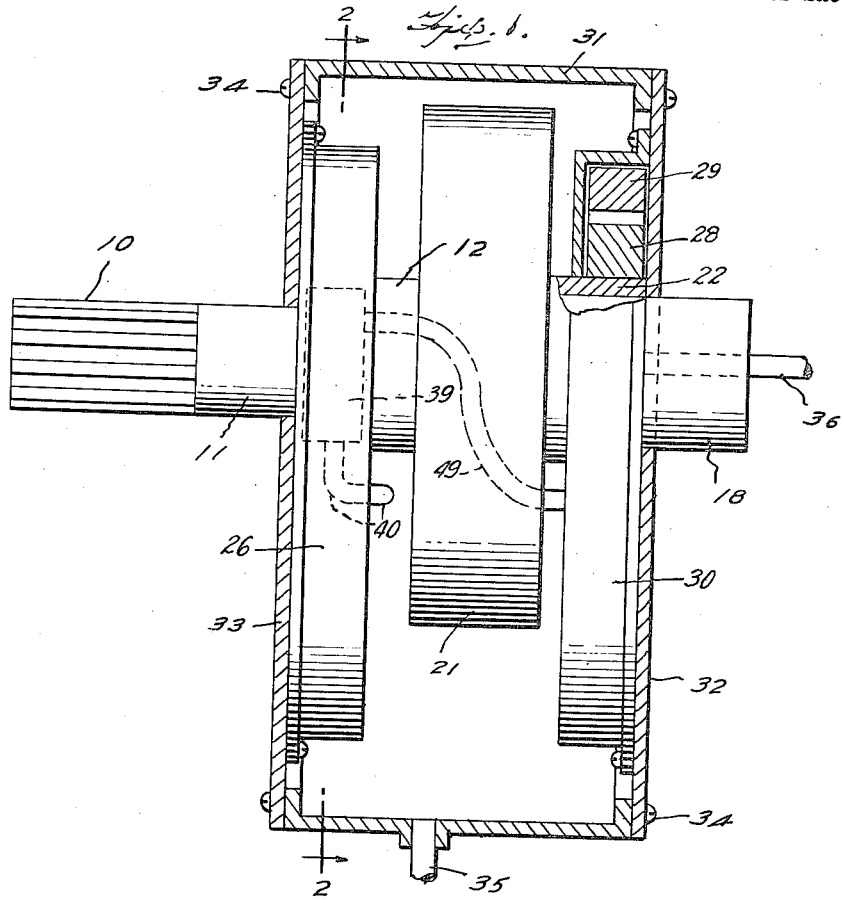
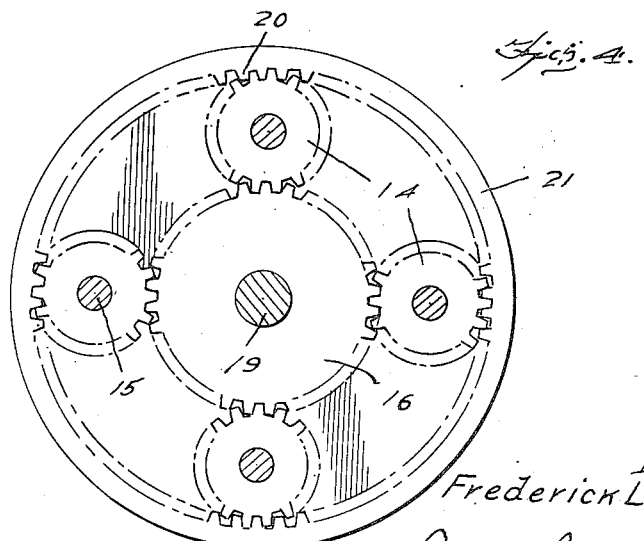
Inventor
Frederick L. Davis
By Francis G. Boswell
ATTY.

Feb. 26, 1957 F. L. DAVIS 2,782,660
VARIABLE SPEED TRANSMISSIONS
Filed Jan. 7, 1953 2 Sheets-Sheet 2

Inventor
Frederick L. Davis
By Francis G. Boswell
ATTY.

United States Patent Office 2,782,660
Patented Feb. 26, 1957

2,782,660

VARIABLE SPEED TRANSMISSIONS

Frederick L. Davis, Fayetteville, N. C.

Application January 7, 1953, Serial No. 330,113

5 Claims. (Cl. 74—752)

The object of the invention is to provide a variable speed transmission in which it will be possible to secure substantially constant speed of the load despite speed variations in the prime mover; to provide an automatic transmission in which the speed variations are accomplished in infinitesimal increments and decrements; and generally to provide a transmission of the kind indicated in which the parts employed are reduced to a minimum, thus making the device susceptible of manufacture and use at low cost.

With this object in view, the invention consists in a construction and combination of parts of which a preferred embodiment is illustrated in the accompanying drawings in which:

Figure 1 is a side elevational view, partly in section, illustrating that form of the invention in which constant speed is accomplished at the output;

Figure 4 is a sectional view on the plane indicated by the line 4—4 of Figure 3.

Figure 2:
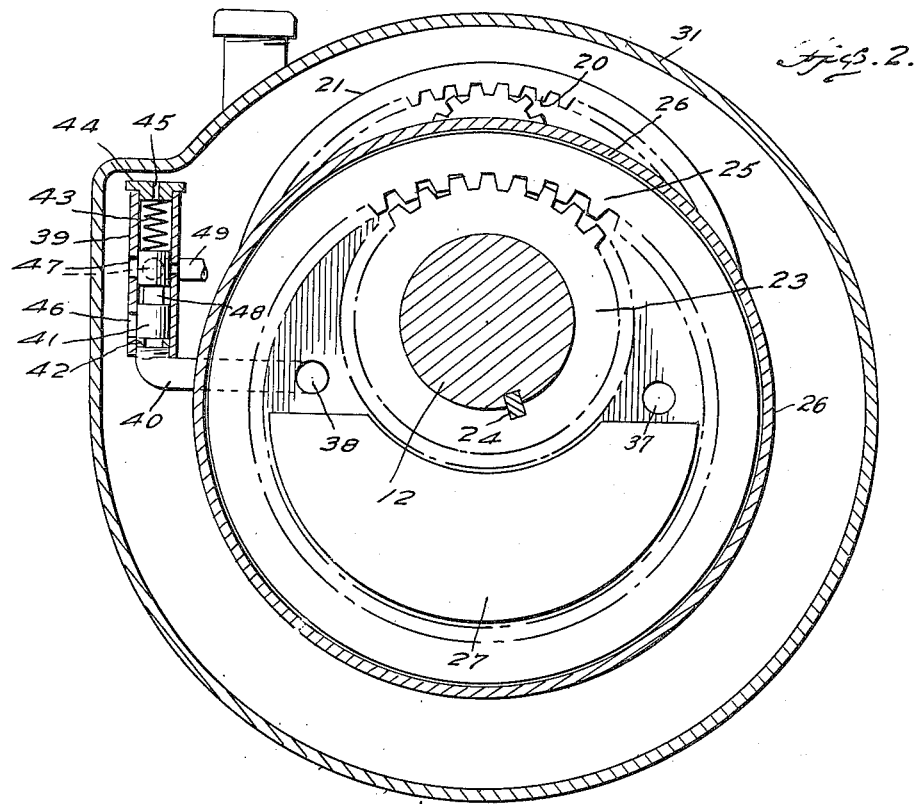
Figure 2 is a sectional view on the plane indicated by the line 2—2 of Figure 1.

Providing for constant speed at the output end despite speed variations in the input end, the invention has useful application in motor vehicles as a means of connecting the vehicle motor with the charging generator, or with the air compressor or with the air conditioning apparatus all of which must remain at substantially constant speed for the greatest efficiency. To this end, the transmission is coupled to the vehicle motor through the medium of the gear 10 just as the generator is conventionally connected at present. This gear is a part of or is connected to the leader 11 which comprises a hub 12 formed integrally with a plate 13 which carries the planetary gears 14 uniformly spaced around the face of the plate and rotating on the stub shafts 15. These gears mesh with the sun gear 16 of the follower 17, the extension 18 of which is broached to receive the gear of the generator, or the compressor motor, or the air conditioning compressor motor, if the vehicle be equipped with all of these, it being understood, of course, that each driven motor has its own automatic transmission.

The sun gear 16 is an integral part of the follower 17 of which the pilot 19 enters and rotates in a suitable bearing in the hub 12.

The planet gears 14 mesh with a ring or orbit gear 20, this latter being in surrounding relation to the planet gears and standing in the vertical plane of the latter. The ring gear 20 is an integral part of the carrier 21 which is of cylindrical form, open on the side facing the leader and closed on the side facing the follower and having a hub 22 surrounding and rotatively mounted on the extension 18 of the follower. The ring gear and its carrier are free to rotate except to the extent that such rotation is controlled in part by means of a pump which is of gear form having the driver 23 keyed to the hub 12 as indicated at 24 and the driven 25 in mesh with the driver and freely movable in a race formed on the inner face of the pump case 26. While the driven is in a surrounding relation to the driver their axes of rotation are perforce eccentric and the filler block 27 of segmental form, fills the space in the case diametrically opposite the points where the driver and driven mesh.

The orbit gear carrier operates a similar pump composed of the driver 28 and driven 29 housed in the case 30, the driver being fixed to the hub 22 of the carrier 21.

Both the leader and the follower, their respective pumps, and the interposed gear mechanism are enclosed in a case 31 of which the end plates 32 and 33 carry the pump cases 30 and 26. The end plates are removably attached to the case 31 by cap screws 34.

The case 31 is charged with a mobile fluid, preferably oil, such as crank case oil, derived, however, from the filter output which is connected to the case at the bottom by means of a tubular connection, indicated at 35. The oil level is maintained substantially in the plane of the axes of the leader and follower, any increase above that level flowing into the crank case through the conductor 36.

The discharges from both pumps, however, are through valves, the two valves being combined in one unit consisting of a case 39 positioned at the periphery of the pump case 26. Case 39 is a cylinder open at its bottom and placed in communication with the discharge of the leader driven pump through the instrumentality of a tubular conductor 40. Within the case is a piston 41 normally seated on the stops 42 by means of a compression spring 43 positioned between its upper end and the cap 44 which is ported in its center as indicated at 45. The cylinder or case 39 is formed with the lateral port 46 near the bottom end with diametrically opposive ports 47 near the upper end of the piston. When the piston abuts the stops 42, it closes the port 46 as well as the ports 47 but when raised, it provides a passage through the ports 47 by reason of a peripheral groove 48, the depth of which is such that the cross sectional area of the groove is half the area of each port 47. Thus when the groove is in registration with such ports, fluid will pass through one around opposite sides of the piston and out through the other. Closing the port 46 when it is in its lowest position, the piston will progressively expose the port 46 as it is elevated against the pressure of the spring. Also, it will progressively bring the ports 47 and the groove 48 into registration, so that, depending on the position of the piston, both the ports 47 and 46 are open to a greater or lesser extent. The discharge of the orbit gear pump is connected by means of a tubular conductor 49 with one of the ports 47.

It is obvious that the apparatus is intended to rotate in a right-handed direction when viewed from the intake end and that the discharges of the pumps are at the left. Since the pump 30 is operated by the orbit or ring gear the latter can only rotate when its pump discharge is free and when the piston 41 is elevated to the point where the ports 47 are opened. But these ports are not opened until such operation is accomplished by the leader driven pump 26.

Figure 3:
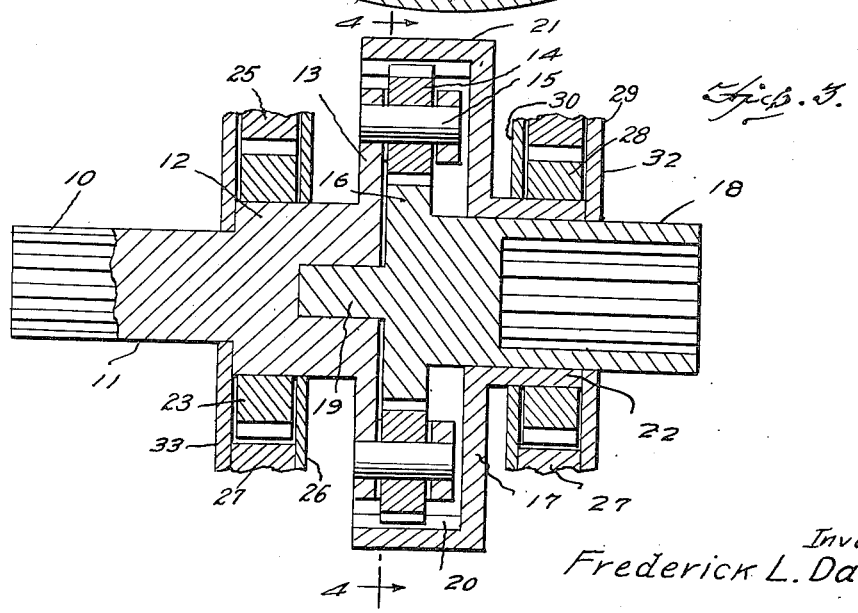
Figure 3 is a diametrical sectional view of the structure of Figure 1 with the case omitted.

Assuming the apparatus to be at rest and the prime mover to be set in motion with consequent rotation of the leader and its pump gears. At this instant, the orbit gear is stationary because the discharge for its pump is closed. Thus the planet gear carrier driven by the leader will rotate right handedly as viewed in Figures 2 and 3, and the planet gears 14 will then have their greatest axial rotation which will be left handedly and which will impart a right handed rotation of the sun gear 16 and thus set the following into rotation when the input-output ratio of rotation will be the lowest. But as the leader pump rotates, the discharge through its output will elevate the valve piston and progressively uncover the ports 47, so that the output of the ring gear driven pump may be progressively discharged in increased volume, thus progressively reducing the restraint on the ring gear and allowing it to rotate on its own axis, thus reducing the axial rotation of the planet gears with unchanging effect on the angular velocity of the follower. This will continue until the leader attains normal speed, but as the leader speed drops off, due to change in speed of the engine or prime mover, the effective area of the ports 47 is reduced by dropping of the piston 41, thereby imposing a restraining force on the ring gear, with consequent increase in the axial speed of the planet gears to make up for the loss in angular speed of the leader and bodily speed of the planet gears. Thus it will be seen that the follower maintains a substantially constant angular velocity, despite changes in angular velocity of the leader.

The invention having been discussed, what is claimed as new and useful is:

1. In a transmission for maintaining a substantially constant speed at the output end despite variations in speed at the input end; a leader constituting the input element; a follower constituting the output element; a planetary gear train operatively connecting said elements and comprising a set of planetary gears and sun gear of which one is carried by the follower and the other by the leader; an orbit gear surrounding and meshing with the planetary gears; a direct-connected gear pump having its driving element axially coincident with the orbit gear; a valve controlling the output of said pump to load the latter and impose a restraining force opposing rotation of the orbit gear and varying such restraining force according to the degree of opening movement of the valve; and leader actuated means to vary the degree of opening movement of said valve, so that, as leader speed may decline, restraining force on the orbit gear will increase to reduce the leader-follower speed ratio and thereby keep the follower speed substantially constant.

2. In a transmission for maintaining a substantially constant speed at the output end despite variations in speed at the input end; a leader constituting the input element; a follower constituting the output element; a planetary gear train operatively connecting said elements and comprising a set of planetary gears and sun gear of which one is carried by the follower and the other by the leader; an orbit gear surrounding and meshing with the planetary gears; a gear pump comprising a spur gear and surrounding ring gear rotating on an axis eccentric to that of the spur gear which is axially coincident with the orbit gear and direct-connected to the latter; a valve controlling the output of said pump to load the latter and impose a restraining force opposing rotation of the orbit gear and varying such restraining force in accordance with the degree of opening movement of the valve; and leader actuated means to vary the degree of opening movement of said valve, so that, as leader speed declines, restraining force on the orbit gear will increase to reduce the leader-follower speed ratio and thereby keep the follower speed substantially constant.

3. In a transmission for maintaining a substantially constant speed at the output end despite variations in speed at the input end; a leader constituting the input element; a follower constituting the output element; a planetary gear train operatively connecting said elements and comprising a set of planetary gears and sun gear of which one is carried by the follower and the other by the leader; an orbit gear surrounding and meshing with the planetary gears; a direct-connected gear pump having its driving element axially coincident with the orbit gear; a valve controlling the output of said pump to load the latter and impose a restraining force opposing rotation of the orbit gear and varying such restraining force according to the degree of opening movement of the valve; and a pump identical with the aforesaid pump but driven by the leader and operatively connected to said valve to vary the degree of opening movement thereto, so that, as leader speed declines, restraining force on the orbit gear will increase to reduce the leader-follower speed ratio and thereby keep the follower speed substantially constant.

4. In a transmission for maintaining a substantially constant speed at the output end despite variations in speed at the input end; a leader constituting the input element; a follower constituting the output element; a planetary gear train operatively connecting said elements and comprising a set of planetary gears and sun gear of which one is carried by the follower and the other by the leader; an orbit gear surrounding and meshing with the planetary gears; a direct-connected gear pump having its driving element axially coincident with the orbit gear; a pump identical with the aforesaid pump but actuated by the leader, a single valve interposed in the outputs of both of said pumps and actuable by the leader-driven pump to vary the degree of opening movement for the discharge of the follower-driven pump, the degree of such opening movement varying with the speed of the leader, so that the orbit gear speed will vary directly with leader speed to provide a leader-follower varying speed ratio that will keep the speed of the follower constant despite declining speed variations in the leader.

5. In a transmission for maintaining a substantially constant speed at the output end despite variations in speed at the input end; a leader constituting the input element; a follower constituting the output element; a planetary gear train operatively connecting said elements and comprising a planetary gear set and sun gear of which one is carried by the follower and the other by the leader; an orbit gear surrounding and meshing with the planetary gears; a direct-connected gear pump having its driving element axially coincident with the orbit gear; a valve controlling the output of said pump to load the latter and impose a restraining force opposing rotation of the orbit gear and varying such restraining force according to the degree of opening movement of the valve; and leader actuated means to vary the degree of opening movement of said valve, so that, as leader speed may decline, restraining force on the orbit gear will increase to reduce the leader-follower speed ratio and thereby keep the follower speed substantially constant; the aforesaid valve consisting of a cylinder, a piston mounted in said cylinder, and spring impelled in one direction to close lateral ports in the cylinder, the output of the orbit driven pump discharging through lateral ports in the cylinder and the output of the leader-driven pump discharging against the end face of the said piston to move the latter to vary the degree to which the piston uncovers said ports.

References Cited in the file of this patent

UNITED STATES PATENTS

| | | |
|---|---|---|
| 2,332,436 | Campbell | Oct. 19, 1943 |
| 2,340,241 | Woods | Jan. 25, 1944 |
| 2,377,199 | Adams et al. | May 29, 1945 |
| 2,455,070 | Lawrence | Nov. 30, 1948 |
| 2,517,188 | Feng | Aug. 1, 1950 |
| 2,665,595 | Moon | Jan. 12, 1954 |